Patented Oct. 12, 1937

2,095,529

UNITED STATES PATENT OFFICE 2,095,529

PROCESS TO MAKE RUBBER THREAD AND RUBBER THREAD TEXTILES

Carl Theodor Pastor, Krefeld, Germany

No Drawing. Application May 24, 1934, Serial No. 727,296. In Germany May 26, 1933

15 Claims. (Cl. 28—1)

This invention relates to a process of manufacturing rubber threads and rubber thread textiles.

It it known that rubber threads may be made by pressing a rubber compound or a rubber dispersion through a suitable nozzle and afterwards guiding the thread thus manufactured through a suitable bath to harden or coagulate the material. The thread thus formed is wound and run through a drying chamber to dry and/or vulcanize the material.

A great disadvantage of this procedure is the necessity of guiding the threads after they have been formed by suitable nozzles, through various baths in order to improve their resistance to the subsequent winding process. The process of guiding the threads through drying chambers over suitable transport belts is also very difficult.

According to the present invention the process of manufacturing rubber threads is improved and simplified in that a suitable thread of textile material is dipped into a suitable rubber compound, e. g. a watery rubber dispersion, allowing the rubber to adhere, dry and vulcanize onto the textile material, and said textile material is then removed by a suitable solvent after the heat has dried and/or vulcanized the rubber coating.

Such textile materials may be used as inner threads, hereinafter called guide threads, which may be readily destroyed, dissolved or both by a suitable agent acting through the pores of the rubber without in the least harming the rubber coating or the ingredients which are embodied in the rubber for increasing its strength, for the acceleration or vulcanization of the rubber, or to insure the aging qualities of the finished product. Natural vegetable or animal or artificial yarns may be used as guide threads.

The rubber coating of the guide thread can be produced in various ways, e. g. by spraying, dipping or guiding the guide threads through a bath of a suitable rubber compound, such as watery rubber dispersions of latex. The coating of the guide thread with rubber may be repeated if necessary in order to insure a uniform coating or for producing special size rubber yarns.

After the coating is finished the rubberized threads are wound on spools after passing in a continuous process through drying chambers, since they can not be wound before the rubber coating has been allowed to dry and coagulate. The thread can also be vulcanized at the same time, but this is not necessary because the stickiness of the dried rubber product can be removed by powdering the thread with talc, stearate of zinc, soap powder or other suitable materials. The treating of the rubberized guide thread with coagulating agents can be eliminated. The guide thread gives the rubber coating sufficient stability and produces a tubelike covering which has time to dry in a continuous process, the rubberized guide threads being freely stretched through drying chambers until the rubber coat is formed and retains its shape.

After drying and vulcanizing the rubber coating the guide thread may be removed or this may be done after the thread has been woven or otherwise formed into a fabric. The guide thread may be removed by passing it in a continuous process through a suitable solvent, or hanks, spools of fabrics of the rubberized guide thread may be immersed in a bath of a solvent.

If the guide thread consists of celanese (acetylcellulose) acetone, a compound of methylenechloride and methylalcohol should be employed. The use of a solvent has the further advantage of clearing out any excess of sulphur or accelerator agent, thereby insuring better aging qualities in the finished product. As the acetone acts on the acetylcellulose threads through the pores of the rubber coating it swells the guide thread to double or triple its size, causing the rubber coating to expand. When the swelling has reached the stage where the acetylcellulose thread is dissolved, the expanded rubber coating acts as a pressure filter and lets the dissolved inner thread ooze out through its pores.

The removal of the guide threads may also be done by a process of carbonization. In this case the guide threads are composed of a suitable vegetable fibre, e. g. viscose. This fibre is first treated with an agent to carbonize it at a certain temperature, e. g. muriatic or sulfuric acid in a 10% solution. The viscose guide thread thus treated is allowed to dry at a low temperature and becomes readily carbonized at a temperature of about 100° C. The carbonized inner thread can subsequently be removed with an alcohol or acetone solution provided that the carbonized guide thread has been reduced to very fine ashes by manipulation.

As rubber compound to form the coating of the guide thread any suitable compound for the production of rubber threads may be used, e. g., crude or crêpe rubber with organic solvents, natural or artificial rubber dispersions which may contain colors or filling materials, vulcanizing agent, vulcanizing accelerators and/or any other suitable materials.

A further great advantage of the present invention is the possibility of making the thread in whole or in part fully elastic or semi-elastic thereby opening up entirely new possibilities for its manufacture into finished goods. By this invention articles may be made by weaving, knitting or other processes using the rubber thread containing the guide thread in its nonrubberelastic stage. The thread may be woven or manipulated the same way as any other thread, and the thread is made in whole or in part rubber-elastic simply by dipping the finished woven or knitted product into the aforesaid solvent, using the same method which is used for the thread.

A special feature of this invention is the removal of the guide thread only at certain places whereby a great many combinations of partially unelastic, partially rubber-elastic goods may be manufactured. Such method of partially removing the guide thread and making the manufactured article partially rubber-elastic consists in covering those parts of the thread which must remain unelastic with a paste of gelatine, glue or a vegetable paste of British gum. The solvent will act on the parts which are exposed and not covered by the paste. The paste can be readily applied by the usual screen printing method or simply by brushing over the article with the paste.

In this application the words "weaving" and "knitting" are intended to include all articles made of textile fibres, such as knitted, crocheted, braided or fancy web goods such as laces and so forth.

It is also possible and in many cases advisable to cover the rubber thread of this invention with a thread of silk, cotton, wool, or artificial silk either before or after the guide thread is removed.

Should the guide threads be removed after the rubber thread containing the guide thread has been covered with another textile material, either by spinning other material around the rubber thread or by blowing finely cut fibres against the sticky rubber thread before vulcanization and vulcanizing the fibre dust onto the thread, it is necessary to select a covering material of such substance that the action of the solvent will not attack it.

The rubber thread of this invention containing the guide thread may be combined with any other textile material, e. g., by using the rubber thread as the warp and/or weft thread of a weave on the usual textile machinery. Ordinary rubber threads, on account of their elasticity, require special equipment for this purpose.

My thread makes possible the manufacture of an even flat weave having a warp and a weft of pure rubber and being rubber-elastic in all directions. A normal rubber thread would become stretched in the process of manufacture, whereby it would not be possible to produce an even weave without prestretching. The rubber thread of this invention with the guide thread intact may be used in every way, shape or manner and will hold its form as a rubber-elastic product after the guide thread is removed just as any other manufactured textile product of the ordinary kind.

Bandages or belts may be produced which in the finished product are partially elastic and partially non-elastic and which retain their form.

I shall now give an example of the manufacturing process without, however, limiting the invention to the details of the method described.

The guide thread for the rubber thread is a textile yarn of round or any other cross-section and made, e. g. of acetylcellulose. The guide thread is so treated that the rubber dispersion readily adheres and is isolated by a suitable coating, e. g., of a shellac emulsion to ward off any action that the alkaline watery rubber dispersion may have on the acetylcellulose. Therefore, it is advisable to isolate the acetylcellulose from the action of free alkali. The thread of acetylcellulose is coated by passing the thread through a bath containing a latex dispersion viz. latex, 1% sulphur colloidal, 2% zinc oxyde, 1% accelerator Pipsol or 774 (i. e. cyclohexylethyl-amino salt of cyclohexyl-ethil-dithiocarbomine acid), and containing also a filling or coloring substance such as chalk, titanic dioxyde, lamp black. The thread is drawn at room temperature through this bath which should have the viscosity of crude oil. The surplus of the rubber coating is removed as the thread leaves the bath by a suitable slit or nozzle, which lets the surplus run back into the container. The thread having thus been covered with liquid rubber is passed through a drying chamber in which a continuous stream of hot air of about 60° C. dries the rubber coating at the rate of about 20 feet per minute. The drying box should be of a suitable length, about 25 feet, and the rubber thread should not come in contact with anything before it is sent through a box in which talc powder is agitated. When it emerges from the talc box and cools down, the thread is wound on drums to form hanks of suitable length. These hanks are then hung up loosely in the vulcanizing chamber and are vulcanized at thermostatic control for about 40 to 60 minutes at 80° C. dry even heat, which should blow through the hanks.

The thread of acetylcellulose is removed through the rubber coating with acetone. This should be done in a closed extractor at about 40° C. An extractor of the "Soxleth" type is used and enough acetone should be sprayed on the material until it runs off clear and no traces of acetylcellulose are left. The thread of acetylcellulose will at first swell and then contract after repeated action of the acetone, the contracted thread being clear of acetylcellulose and thus rubber-elastic.

It is advisable to pass the rubber-elastic material for a minute or so through a bath of acetone, in which a suitable quantity of an age protecting agent (e. g. 2% aldol B naphthylamine) has been dissolved. The age protecting agent can also be added to the acetone which is used for the extraction and will diffuse therewith into the rubber in the same way. The capillarity of the thread is not noticeable after the acetylcellulose has been removed because the elastic-rubber will contract in the same way as a rubber tube from which all air has been removed. However, the capillarity of the thread will cause the rubber thread of this invention to retain its shape.

In certain cases it is advisable to vulcanize in two steps viz. to stop before vulcanization is reached and then vulcanize again to complete the vulcanization.

The rubber thread of this invention which has been made rubber-elastic by removing the guide thread may be covered beforehand by a suitable covering like silk, cotton, artificial silk. If the thread is covered with yarn dust (very short ends of staple fibre having a length of $\frac{1}{16}$ of an inch more or less) this dust is allowed to become vulcanized to the rubber yarn. The covering material or the textile dust vulcanized onto the rubber yarn must not be dissolved by the solvent. It must, therefore, be of a substance that the solvent e. g. acetone does not attack, such as natural silk or silk dust, or cotton or cotton dust, etc.

If a weave is produced in which textile covered or uncovered rubber threads are used according to this invention and in which part of the weave must be rubber-elastic, then a screen is placed over the weave made of threads according to this invention and through the screen a paste of gelatine, British gum, gum tragacanth, gum arabic or any such substance or any combination of gums is applied. The paste is then allowed to dry and will form a protective film. The acetone is then allowed to act on the unprotected parts of the rubber weaves and after those parts have been dissolved and made rubber-elastic the protective paste is removed from the rubber weave with hot water.

After having thus fully described my invention, I claim:

1. A process of manufacturing rubber threads comprising the following steps: coating textile fibre material at least once with a rubber compound, drying and vulcanizing the coated thread, covering it with other textile material, forming it into a fabric, covering at least parts of the fabric with a protective agent, applying an agent destructive of the inner threads of textile fibre material, whereby the inner textile material is removed at such places in the fabric where the protective agent does not hinder the penetration of the destructive agent.

2. A process of manufacturing rubber threads comprising the following steps: coating textile fibre material at least once with a rubber compound, covering the coated fibre with other textile material, forming it into a fabric, covering certain parts of the fabric with a protective agent, applying a liquid solvent to the fabric, whereby the inner textile fibre material will be removed where the protective agent does not hinder the penetration of the liquid solvent.

3. The process of making rubber threads, which comprises the following steps: covering a textile fibre yarn with a rubber compound to produce a porous coating thereon, hardening said coating, and introducing an agent destructive of said yarn through the pores of the said coating, and extracting the said agent and the solubilized yarn from said coating, without destroying the latter, whereby a rubber thread is produced.

4. The process claimed in claim 3, in which said hardening step comprises drying and vulcanizing the said coating.

5. The process of making rubber threads, which comprises the following steps: covering a textile fibre yarn with a rubber compound to produce a coating thereon, hardening said coating, introducing through said coating an agent destructive of said yarn, and extracting the said agent and the yarn consumed thereby through the said coating without destroying the latter, whereby a rubber thread is produced.

6. The process of making tubular rubber threads, which comprises the following steps: completely encasing a textile fibre yarn in a liquid rubber compound sheath, hardening said sheath, introducing through said sheath at predetermined sections a liquid agent destructive of said yarn and extracting a predetermined length of solubilized yarn from said sheath which completely encases the said yarn, whereby a rubber thread is produced which is elastic in the section where the said yarn was eliminated while being inelastic where the yarn was not eliminated.

7. The process claimed in claim 3, in which said extracting step is performed without admitting air to the inside of said rubber thread, whereby the latter will contract due to the vacuum produced therein.

8. The process claimed in claim 3, in which said hardening step comprises drying and vulcanizing the said coating and said extracting step is performed without admitting air to the inside of said rubber thread, whereby the latter will contract due to the vacuum produced therein.

9. The process claimed in claim 5, in which said rubber compound consists of a watery rubber dispersion.

10. The process claimed in claim 5, in which said rubber compound consists of a watery rubber dispersion and in which said textile fibre yarn is passed through a nozzle at least once before the hardening step.

11. The process claimed in claim 5, in which said rubber compound coating is applied by passing the said yarn through a container filled with a watery rubber dispersion.

12. The process of making tubular rubber threads provided with a textile covering, which comprises the following steps: completely encasing a textile fibre yarn in a sheath of a liquid rubber compound, drying and vulcanizing said sheath, covering said sheath with textile threads, and vulcanizing the latter onto the sheath, introducing from the outside through said covered sheath a chemical agent destructive of said yarn, and thereafter extracting the said dissolved yarn from said covered sheath, which completely encases the said yarn, whereby a covered tubular rubber thread is produced.

13. The process claimed in claim 12, in which said yarn is chemically extracted through the pores of said rubber sheath and said textile covering, the latter consisting of a material different from that of the said yarn.

14. The process of producing tubular rubber threads, which comprises the following steps: encasing a thread of acetyl cellulose in a sheath of a liquid rubber compound, drying and vulcanizing said sheath, and thereafter applying acetone to the thread encased in said sheath to cause said thread to swell, and continuing to apply acetone to said thread until the same is destroyed, whereupon the said rubber sheath will contract, forcing the acetone and the dissolved thread out through the pores of the said sheath, whereby a tubular rubber thread is produced.

15. A process of manufacturing rubber threads comprising the following steps: coating textile fibre material at least once with a rubber compound, hardening the coated thread, covering it with other textile material forming it into a fabric, covering at least parts of the fabric with a protective agent, applying an agent destructive of the inner threads of textile fibre material, whereby the inner textile material is removed at such places in the fabric where the protective agent does not hinder the penetration of the destructive agent.

CARL THEODOR PASTOR.